United States Patent Office 3,646,014
Patented Feb. 29, 1972

3,646,014
CHEMICAL COMPOUNDS
Henry Bader and John H. Biel, Milwaukee, Wis., assignors to Aldrich Chemical Company, Inc., Milwaukee, Wis.
No Drawing. Continuation-in-part of application Ser. No. 548,402, May 9, 1966. This application Dec. 30, 1966, Ser. No. 606,053
Int. Cl. C07d 29/16
U.S. Cl. 260—240 K      17 Claims

ABSTRACT OF THE DISCLOSURE

Compounds of the formula

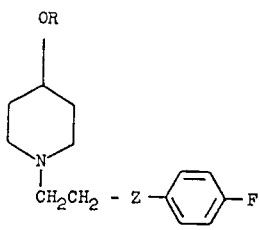

in which R and Z are as defined below, which possess analgesic and muscle relaxant activity and are useful as analgesics and skeletal muscle relaxants in animals, and processes for the preparation of the foregoing compounds.

CROSS-REFERENCE TO RELATED APPLICATIONS

This application is a continuation-in-part of our prior, copending application Ser. No. 548,402, filed May 9, 1966, now abandoned.

It is an object of the present invention to provide a new class of therapeutic compounds. It is another object of the present invention to provide novel compounds having analgesic and muscle relaxant activity. It is a further object of the present invention to provide a process for preparing the novel therapeutic compounds. It is still a further object of the present invention to provide a novel method of producing analgesia and muscular relaxation.

These and other objects which may appear as the specification proceeds are achieved by this invention which comprises the provision of compounds selected from the group consisting of compounds having the following formula (I)

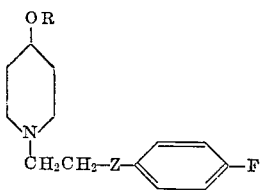

wherein R is a member selected from the group consisting of hydrogen and (lower)alkanoyl and Z is a radical selected from the group consisting of

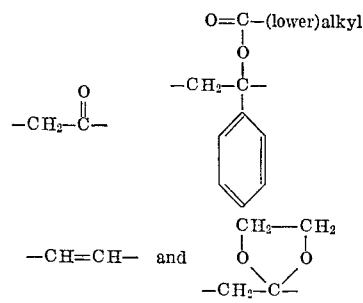

and the pharmaceutically acceptable nontoxic salts thereof.

The pharmaceutically acceptable nontoxic salts include the organic and inorganic acid addition salts, e.g., those prepared from acids such as hydrochloric, sulfuric, sulfamic, tartaric, fumaric, hydrobromic, hydriodic, glycolic, citric, maleic, phosphoric, succinic, acetic, nitric and the like. Such salts are prepared by conventional methods.

The term "(lower)alkyl" as used herein means both straight and branched chain aliphatic hydrocarbon radicals having from 1 to 8 carbon atoms, such as methyl, ethyl, propyl, isopropyl, butyl, isobutyl, t-butyl, amyl, hexyl, 2-ethylhexyl, etc.

Similarly, where the term "(lower)" is used as part of the description of another group, e.g., "(lower)alkanoyl," it refers to the alkyl portion of such group which is therefore as described in connection with "(lower)alkyl."

Thus, the compounds of this invention have the formulae

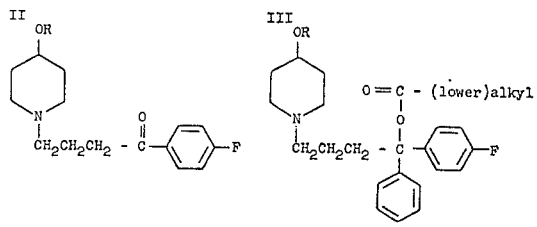

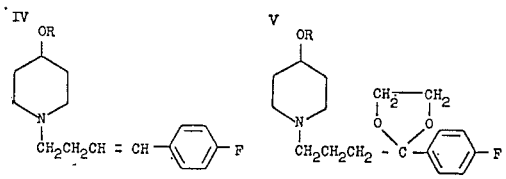

wherein R is as described above.

The preferred compounds of this invention have the formula

VI

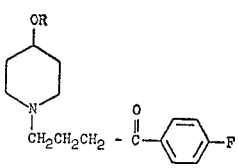

wherein R is as described above.

Some of the compounds of the present invention contain an asymmetric carbon atom, i.e., those of Formula III, and thus normally occur as a racemic mixture of the two optical isomers. Both isomers are active, and both of these isomers and mixtures thereof are included within the scope of the present invention. The individual isomers are prepared in pure form from a racemic mixture by resolution with an optically active acid, e.g. camphorsulfonic acid, tartaric acid, by the procedure used on similar amines, e.g. α-phenethylamine, amphetamine.

The compounds of this invention possess analgesic activity and muscle relaxant activity making them useful for the treatment of pain and for muscle relaxation in animals.

The compounds were tested for analgesic activity by the phenylquinone test of Sigmund et al., Proc. Soc. Exptl. Biol. and Med. 95, 729 (1957), in which an analgesic reduces the induced writhing of the mice. At dosages of 150 mgm./kg. p.o. in mice given 50 minutes before the phenyl-p-quinone was injected, the reduction was found to be 65% for aspirin and 100% for N-[γ-(p-fluorobenzoyl)propyl]-4-piperidinol hydrochloride. A reduction of 100% was also obtained at dosages of 50 and 30 mg./kg. of this compound. This indicated that this compound is an analgesic agent. Doses as low as 10 mg./kg. p.o. of this compound in mice exhibited muscle relaxant activity. The activity was determined by pressing the abdomen and flexing the hind limbs of the treated mouse. A mouse treated with a muscle relaxant drug shows little if any resistance to flexing or abdominal tone.

The compounds of this invention are prepared in the following manner:

Compounds of Formula II are prepared by reacting 4 - hydroxypiperidine with p-fluorobenzoylpropyl halide, such halide being a chloride, bromide or iodide, in an inert solvent such as benzene, toluene or xylene. Aprotic solvents, such as dimethylsulfoxide or dimethylformamide, are to be avoided in that their use may result in the fluorine atom also being replaced by the 4-hydroxypiperidine. The compound thus obtained has the formula

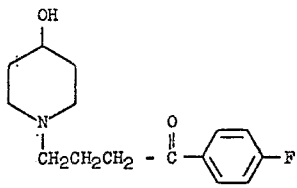

N-[γ-(p-fluorobenzoyl)propyl]-4-piperidinol and is converted to an ester by esterification with, for example, an acid halide of the formula

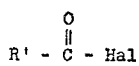

wherein R' is (lower)alkyl and Hal is bromo, chloro or iodo, but preferably chloro or an anhydride of the formula

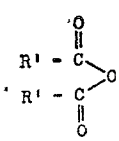

wherein R' is (lower)alkyl. Preferably, the reaction is carried out with an acid chloride in a nonreactive solvent such as benzene and in the presence of a tertiary amine such as triethylamine at reflux temperature.

Compounds of Formula III are prepared by reaction or N-[γ-(p-fluorobenzoyl)propyl] - 4 - hydroxypiperidine with a Grignard reagent, phenylmagnesium halide, e.g. chloride, bromide or iodide, in a solvent such as tetrahydrofuran to form a compound of the formula

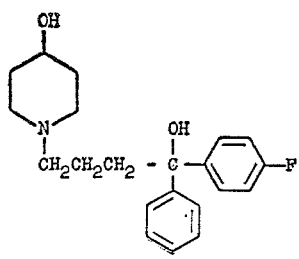

Esterification of this compound as described above gives the pyridyl ester having the formula

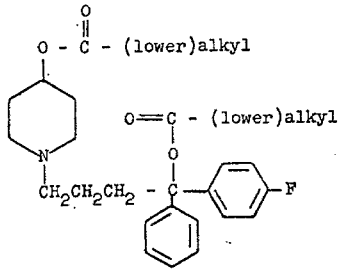

Selective hydrolysis of the 4-piperidyl ester with, for example, aqueous methanolic sodium hydroxide gives the compound of the formula

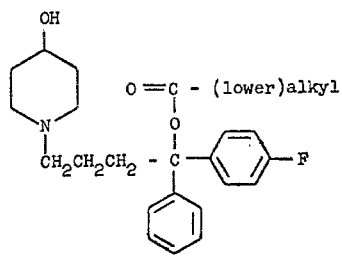

other 4-piperidyl esters are conveniently prepared by re-esterification by the method described above.

The compounds of Formula IV are prepared by reduction of N-[γ-(p-fluorobenzoyl)propyl] - 4 - piperidinol, or a salt thereof, with, for example, sodium borohydride, preferably in the presence of a solvent such as methanol. The reduction results in the formation of the 4-piperidinol compound of the formula

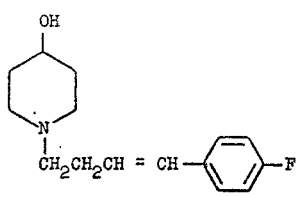

The esters are obtained from this compound by the method described above.

The compounds of Formula V are prepared by reacting 4-hydroxypiperidine with 4-halo-1,1-ethylenedioxy-1-(4-fluorophenyl)butane, "halo" being chloro, bromo or iodo, in an inert solvent such as benzene, toluene or xylene. The compound thus attained has the formula

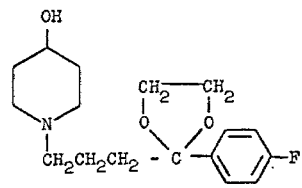

1,1-ethylenedioxy-1-(4-fluorophenyl)-
4-(4-hydroxypiperidino)butane and is converted to an ester by the method described above.

The starting materials are known compounds described in the literature, e.g., p-fluoro-γ-chlorobutyrophenone and 4-chloro-1,1-ethylenedioxy-1-(4-fluorophenyl)butane are described in Belgian Pat. No. 660,763.

The compounds of this invention may be administered as the free bases or in the form of their nontoxic addition salts. They may be compounded and formulated into pharmaceutical preparations in unit dosage form for oral or parenteral administration with organic or inorganic solid materials or liquids which are pharmaceutically acceptable carriers. The compositions may take the form of tablets, powders, granules, capsules, suspensions, solutions and the like. Such compositions are considered within the scope of this invention.

The compounds of this invention when administered orally or parenterally in an effective amount are effective in the treatment of pain and for producing muscle relaxation in animals.

The following examples are intended to illustrate the invention described herein without unduly restricting it.

Example 1.—Preparation of N-[γ-(p-fluorobenzoyl) propyl]-4-piperidinol hydrochloride

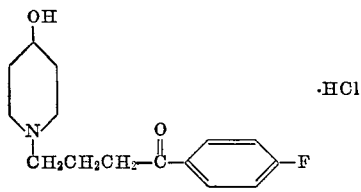

A mixture of 25.0 g. (0.25 mole) 4-hydroxypiperidine, 50.0 g. (0.25 mole) of 4-chloro-p-fluorobutyrophenone, 16.0 g. (0.25 mole) sodium bicarbonate and a trace of potassium iodide was refluxed and stirred in 200 ml. of dry toluene for 48 hours. The reaction mixture was cooled, filtered, washed with toluene and concentrated to a yellow oil which solidified on standing. The solid was recrystallized from acetone-n-heptane to give 47.0 g. of product, N-[γ-(p-fluorobenzoyl)propyl] - 4 - piperidinol [also having the name 4-(4-hydroxy-piperidino)-p-fluoro-butyrophenone], M.P. 78–84° C. The hydrochloride salt was prepared in chloroform by the addition of HCl gas, the solution concentrated, azeotroped with benzene to remove any moisture, and recrystallized twice from ethanol, M.P. 175–177° C.

*Analysis.*—Calc'd for $C_{15}H_{21}NO_2ClF$ (302.3) (percent): C, 59.59; H, 7.00; N, 4.63; Cl, 11.73; F, 6.28. Found (percent): C, 59.62; H, 6.79; N, 4.57; Cl, 11.77; F, 6.05.

Example 2.—Preparation of N-[δ-p-fluorophenyl)-γ-butenyl]-4-piperidinol

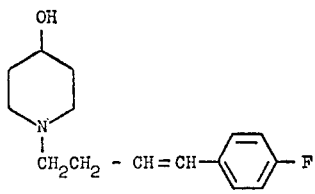

To a cooled (0° C.) solution of 3.0 g. (0.01 mole) of 4 - (4-hydroxy-piperidino)-p-fluorobutyrophenone hydrochloride in 150 ml. of methanol was added slowly over a 15-minute period 5.7 g. (0.15 mole) of sodium borohydride. After standing at room temperature for 16 hours, the solvent was evaporated and about 50 ml. of water was added to the residue. The aqueous solution was extracted with methylene chloride and the solution dried over magnesium sulfate. Evaporation of the solvent gave an oil which was distilled at 145–165° C. (bath)/0.001 mm., yielding 1.2 g. of an oily product, N-[δ-p-fluorophenyl)-γ-butenyl]-4-piperidinol, [also having the name 1-(4'-p-fluorophenyl-but-3'-enyl)-4-hydroxypiperidine] which crystallized to a gummy solid.

*Analysis.*—Calc'd for $C_{15}H_{22}NO_2F$ (percent): C, 72.24; H, 8.09; N, 5.62. Found (percent): C, 72.20; H, 8.37; N, 5.75.

Example 3.—Preparation of N-[γ-(p-fluorobenzoyl)-propyl]-4-piperidyl propionate hydrochloride

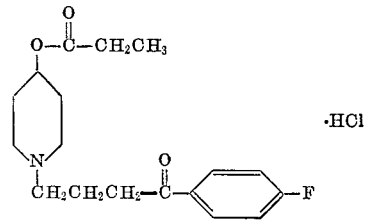

A solution of 5.0 g. (0.0188 mole) of 4-(4-hydroxy-piperidino)-p-fluorobutyrophenone and 3.8 ml. (0.03 mole) of propionic anhydride in 20 ml. of pyridine was allowed to stand at room temperature for 73 hours. The solvent was evaporated and the residue taken up in ether. The solution was washed with saturated sodium bicarbonate and dried over magnesium sulfate. Evaporation of the solvent gave a gum which was taken up in dry ether and ethereal hydrogen chloride added resulting in 4.9 g. of the product, N-[γ-(p-fluorobenzoyl)propyl]-4-piperidyl propionate hydrochloride, M.P. 154–162° C. Recrystallization of a sample from ethyl acetate changed the melting point to 152–158° C.

*Analysis.*—Calc'd for $C_{18}H_{25}NO_3ClF$ (percent): C, 60.41; H, 7.04; N, 3.92; Cl, 9.91. Found (percent): C, 60.07; H, 7.35; N, 4.23; Cl, 10.40.

Example 4.—Preparation of N-[δ-(p-fluorophenyl)-γ-butenyl]-4-piperidyl propionate hydrochloride

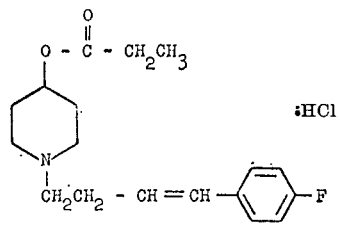

A solution of 8.9 g. (0.0356 mole) of 1-(4'-p-fluorophenyl-but-3'-enyl)-4-hydroxypiperidine and 4.8 ml. (0.038 mole) of propionic anhydride in 15 ml. of pyridine was allowed to stand at room temperature for 22 hours. The solvent was evaporated and the residue taken up in ether. The solution was washed with saturated sodium bicarbonate and dried over magnesium sulfate. Evaporation of the solvent gave a gum which was taken up in dry ether and ethereal hydrogen chloride was added resulting in 6.0 g. of the product, N-[δ-(p-fluorophenyl)-γ-butenyl]-4-piperidyl propionate hydrochloride. Recrystallization from ethyl acetate gave the product, M.P. 109–137° C.

*Analysis.*—Calc'd for $C_{18}H_{25}NO_2ClF$ (percent): C, 63.24; H, 7.37; N, 4.10; Cl, 10.37; F, 5.56. Found (percent): C, 62.52; H, 7.68; N, 4.30; Cl, 10.75; F, 5.45.

Example 5.—Preparation of N-[δ-(p-fluorophenyl)-δ-phenyl-δ-acetoxy]butyl-4-piperidinol

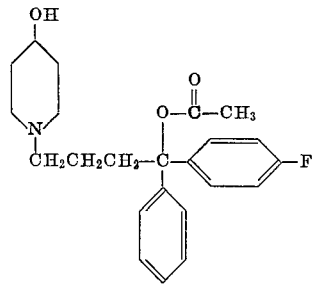

To a refluxing solution of 12.7 g. (0.07 mole) of phenylmagnesium bromide in 200 ml. of dry tetrahydrofuran was added dropwise over a five-minute period, 3.5 g. (0.0116 mole) of 4-(4-hydroxypiperidino)-p-fluorobutyrophenone hydrochloride in 50 ml. of dry tetrahydrofuran. After stirring at reflux for 4.5 hours, the solution was cooled in an ice bath and 10 ml. of water added dropwise. Filtration of the solution followed by evaporation of the solvent yielded 12.3 g. of a yellow gum which was dissolved in 2 N hydrochloric acid. The aqueous acid solution was made basic with 10% sodium hydroxide and the solution extracted with methylene chloride. The methylene chloride solution was dried over magnesium sulfate and the solvent evaporated yielding 3.5 g. of a gum whose infrared spectrum showed the presence of some unreacted ketone. The base was converted into the diacetate by disolving in 1.94 ml. (0.024 mole) of pyridine and 2.2 ml. (0.022 mole) of acetic anhydride and allowing it to stand at room temperature for 48 hours. About 5.0 ml. of water was then added and the solution allowed to stand for 1 hour. The solution was made basic with saturated sodium bicarbonate followed by extraction with methylene chloride. The methylene chloride was dried over magnesium sulfate and evaporated to dryness yielding 4.5 g. of the crude diacetate. The diacetate was dissolved in pentane and absorbed on 100 g. of neutral alumina. The column was eluted with pentane, the first 1000 ml. being discarded and the next 750 ml. contained 2.6 g. of an oil, N-[ε-(p-fluorophenyl)-δ-phenyl-δ - acetoxy]butyl-4-piperidyl acetate, whose infrared spectrum showed no ketone. The oil was then dissolved in a solution of 20 ml. of 10% sodium hydroxide and 150 ml. of methanol, and left to stand at room temperature for 5 days. The methanol was evaporated in vacuo, and the aqueous solution extracted with methylene chloride. The methylene chloride solution was dried over magnesium sulfate and the solvent was removed yielding 2.4 g. of an oil whose infrared spectrum showed a sharp peak at 6.0μ. The oil was distilled once at 135–210°/0.1 mm., and a second time at 150–210° (bath)/0.15 mm., yielding 1.0 g. N-[δ-(p-fluorophenyl)-δ-phenyl-δ-acetoxy] butyl-4-piperidinol as a yellow, oily product.

*Analysis.*—Calc'd for $C_{23}H_{28}NFO_3$ (percent): C, 71.66; H, 7.32; N, 3.63. Found (percent): C, 72.41; H, 7.92; N, 3.60.

Example 6

When, in the procedure of Example 3, propionic anhydride is replaced by an equal molar amount of acetic anhydride and butyric anhydride, there are obtained, N-[γ-(p-fluorobenzoyl)-propyl]-4-piperidyl acetate hydrochloride and N-[γ-(p-fluorobenzoyl)propyl]-4-piperidyl butyrate hydrochloride, respectively.

Example 7

When, in the procedure of Example 4, propionic anhydride is replaced by an equal molar amount of acetic anhydride and butyric anhydride, there are obtained, N-[δ-(p-fluorophenyl)-γ-butenyl]-4-piperidyl acetate hydrochloride, and N-[δ-(p-fluorophenyl)-γ-butenyl] - 4 - piperidyl butyrate hydrochloride, respectively.

Example 8

When, in the procedure of Example 5, acetic anhydride is replaced by an equal molar amount of propionic anhydride and butyric anhydride, there are first obtained, N - [δ - (p - fluorophenyl) - δ-phenyl-δ-propionyloxy] butyl-piperidyl propionate and N-[δ-fluorophenyl) - δ-phenyl - δ - butyryloxy]butyl - 4 - piperidyl butyrate; and after reduction with aqueous methanolic sodium hydroxidle, there are obtained, N-[δ-(p-fluorophenyl)-δ-phenyl-δ-propionyloxy]butyl-4-piperidinol and N-[δ-(p-fluorophenyl) - δ - phenyl - δ - butyryloxy]butyl-4-piperidinol, respectively.

Example 9.—Preparation of 4-chloro-1,1-ethylenedioxy-1-(4-fluorophenyl)butane

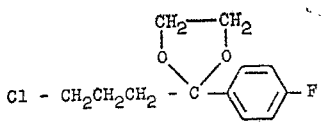

A mixture of ethylene glycol (62 g., 1.0 mole) p-toluenesulfonic acid monohydrate (8.0 g., 42 mmoles), and benzene (1.0 liter) was refluxed for 18 hours and water plus ethylene glycol (4.5 ml. was collected. 4-chloro-p-fluorobutyrophenone (80–85% purity; 100 g., 0.4–0.44 mole) was added and reflux continued for 24 hours. More water plus ethylene glycol (16 ml.) was collected. The reaction solution was washed with 5% aqueous sodium bicarbonate (3 × 250 ml.), dried, and evaporated in vacuo. The reddish-brown oily residue was distilled. The product, 4- chloro-1,1-ethylenedioxy-1-(4-fluorophenyl)butane, was collected at 141–154° C. (6–7 mm.), yield, 118 g. Some of the ketal was redistilled for analytical purposes, B.P. 148.5° C. (4–5 mm.), $n_D^{19.5}$ 1.5075.

*Analysis.*—Calc'd for $C_{12}H_{14}ClFO_2$ (percent): C, 58.90; H, 5.77; Cl, 1449. Found (percent): C, 59.70; H, 5.97; Cl, 14.33.

Example 10.—Preparation of 1,1-ethylenedioxy-1-(4-fluorophenyl)-4-(4-hydroxypiperidino)butane

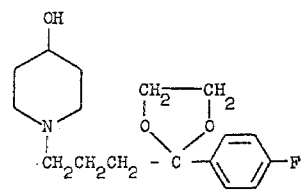

A mixture of 4-piperidinol (4.75 g., 50 mmoles), 4-chloro - 1,1 - ethylenedioxy - 1 - (4 - fluorophenyl)butane (12.2 g., 50 mmoles), anhydrous sodium carbonate (10.6 g., 0.1 mole), and toluene (25 ml.) was refluxed for 20 hours. Evaporation of the filtrate afforded an orange, viscous oily residue, which was purified by distilling on a Kugelrohr apparatus. The product, 1,1-ethylenedioxy-1-(4-fluorophenyl) - 4 - (4 - hydroxypiperidino)butane, was collected at 154° C. and 0.05–0.1 mm., as a pale, clear highly viscous liquid, which crystallized on standing as white needles, yield, 11.9 g. A small amount of the solids was recrystallized from benzene-n-heptane, M.P. 79–81° C.

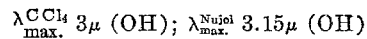

*Analysis.*—Calc'd for $C_{17}H_{24}FNO_3$ (percent): C, 66.0; H, 7.82; N, 4.53. Found (percent): C, 65.84; H, 7.69; N, 4.64.

Example 11

When, in the procedure of Example 3, 4-(4-hydroxypiperidino)-p-fluorobutyrophenone is replaced by an equal molar amount of 1,1-ethylenedioxy-1-(4-fluorophenyl)-4-(4-hydroxypiperidino)butane, there is obtained 1,1-ethylenedioxy-1-(4-fluorophenyl) - 4 - (4-propionyloxypiperidino)butane.

While this invention has been described in terms of its preferred embodiment, those skilled in the art will appreciate that modifications can be made without departing from the spirit and scope of the invention.

What is claimed is:

1. A compound selected from the group consisting of compounds of the formula

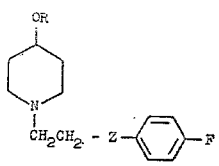

wherein R is a member selected from the group consisting of hydrogen and (lower)alkanoyl and Z is a radical selected from the group consisting of

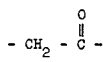 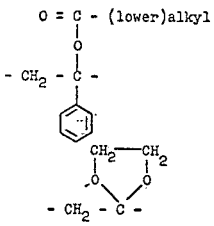

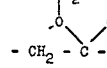

and the pharmaceutically acceptable nontoxic salts thereof.

2. A compound of claim 1 having the formula

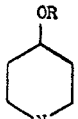
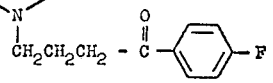

wherein R is a member selected from the group consisting of hydrogen and (lower)alkanoyl; and the pharmaceutically acceptable nontoxic salts thereof.

3. A compound of claim 1 having the formula

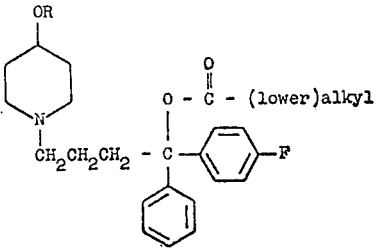

wherein R is a member selected from the group consisting of hydrogen and (lower)alkanoyl; and the pharmaceutically acceptable nontoxic salts thereof.

4. A compound of claim 1 having the formula

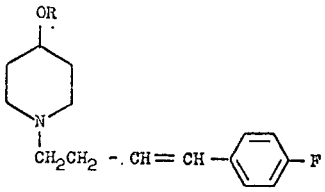

wherein R is a member selected from the group consisting of hydrogen and (lower)alkanoyl; and the pharmaceutically acceptable nontoxic salts thereof.

5. The compound of claim 1 having the formula

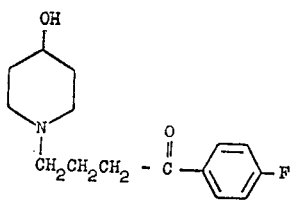

6. The pharmaceutically acceptable nontoxic salts of the compound of claim 5.

7. The compound of claim 1 having the formula

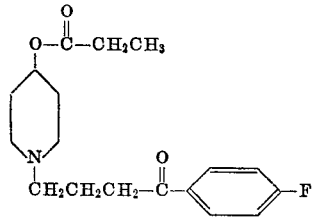

8. The pharmaceutically acceptable nontoxic salts of the compound of claim 7.

9. The compound of claim 1 having the formula

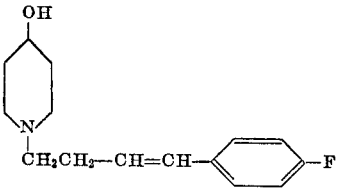

10. The compound of claim 1 having the formula

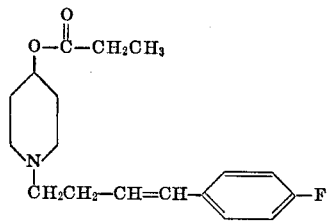

11. The compound of claim 1 having the formula

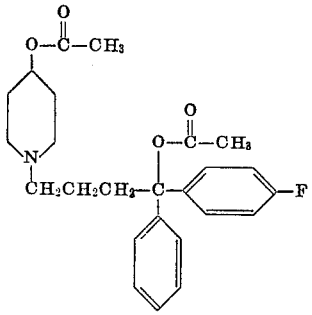

12. The compound of claim 1 having the formula

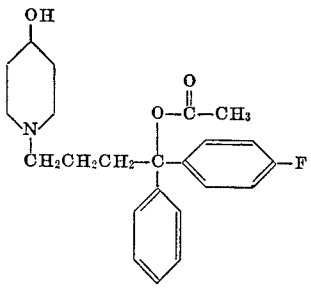

13. The compound of claim 1 having the formula

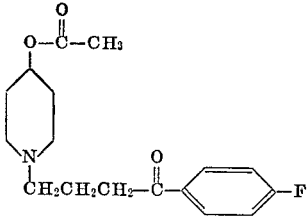

14. The compound of claim 1 having the formula

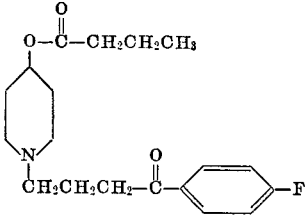

15. A compound of claim 1 having the formula

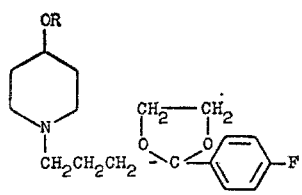

wherein R is a member selected from the group consisting of hydrogen and (lower)alkanoyl; and the pharmaceutically acceptable nontoxic salts thereof.

16. The compound of claim 1 having the formula

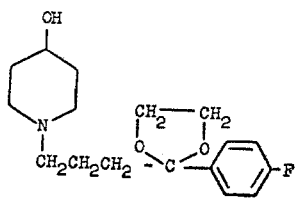

17. A compound selected from the group consisting of compounds having the formula

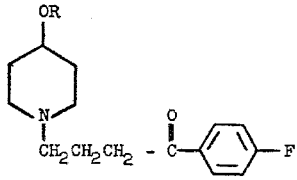

wherein R is a member selected from the group consisting of H and lower alkanoyl; and the pharmaceutically acceptable salts thereof.

References Cited

UNITED STATES PATENTS 3,553,225  1/1971  Kaiser et al. _____ 260—240

HENRY R. JILES, Primary Examiner

H. T. MOATY, Assistant Examiner

U.S. Cl. X.R.

424—267; 260—340.9, 293.27, 293.8, 293.81, 293.82